(12) United States Patent
Hauser et al.

(10) Patent No.: US 7,765,556 B2
(45) Date of Patent: Jul. 27, 2010

(54) INTELLIGENT AND EVENT-BASED DATA POPULATION

(75) Inventors: Andreas Hauser, Dielheim-Horrenberg (DE); Dirk Stumpf, Bruchsal (DE)

(73) Assignee: SAP AG, Walldorf (DE)

( * ) Notice: Subject to any disclaimer, the term of this patent is extended or adjusted under 35 U.S.C. 154(b) by 992 days.

(21) Appl. No.: 10/137,208

(22) Filed: Apr. 30, 2002

(65) Prior Publication Data

US 2003/0167351 A1    Sep. 4, 2003

Related U.S. Application Data

(60) Provisional application No. 60/360,669, filed on Mar. 1, 2002.

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................................................... 719/318
(58) Field of Classification Search ................. 709/201; 713/300; 714/15; 717/168–178, 120–122; 707/10, 200, 203; 719/310–320
See application file for complete search history.

(56) References Cited

U.S. PATENT DOCUMENTS

| | | | |
|---|---|---|---|
| 5,586,334 A | | 12/1996 | Miyazaki et al. |
| 5,748,971 A | * | 5/1998 | Choi et al. ................... 713/320 |
| 5,978,922 A | * | 11/1999 | Arai et al. ..................... 713/323 |
| 6,295,611 B1 | | 9/2001 | Connor et al. |
| 6,330,586 B1 | * | 12/2001 | Yates et al. .................. 709/201 |
| 6,502,207 B1 | * | 12/2002 | Itoh et al. ....................... 714/15 |
| 6,662,310 B2 | * | 12/2003 | Lopez et al. .................. 714/15 |
| 6,681,389 B1 | * | 1/2004 | Engel et al. .................. 717/173 |
| 7,047,441 B1 | * | 5/2006 | Lomet et al. ................... 714/13 |
| 7,140,027 B2 | * | 11/2006 | Calusinski ................... 719/316 |
| 2001/0037475 A1 | * | 11/2001 | Bradshaw et al. ............. 714/15 |
| 2002/0073410 A1 | * | 6/2002 | Lundback et al. ........... 717/171 |

(Continued)

FOREIGN PATENT DOCUMENTS

EP    0 747 810 A    12/1996

(Continued)

OTHER PUBLICATIONS

Ambras, James P., et al., "Microscope: An Integrated Program Analysis Toolset," *Hewlett-Packard Journal*. Hewlett-Packard Co., Palo Alto, CA, US, No. 4, Aug. 1, 1988, pp. 71-82, XP000106161.

(Continued)

*Primary Examiner*—Diem K Cao
(74) *Attorney, Agent, or Firm*—Schwegman, Lundberg & Woessner, P.A.

(57) ABSTRACT

Methods and apparatus for populating one or more computer applications with data. The method includes storing events, automatically selecting one or more events from the stored events, and sending the selected one or more events to a computer application. The events are selected automatically in response to a start-up of the computer application after an occasion when the computer application does not run. Each event specifies an operation that the computer application performed and one or more data objects involved with the operation. The events are sent so that the computer application can produce updated results even when the contents of the data objects have been changed when the computer application was not running.

25 Claims, 2 Drawing Sheets

U.S. PATENT DOCUMENTS

| | | | | |
|---|---|---|---|---|
| 2002/0178104 | A1* | 11/2002 | Hausman | 705/37 |
| 2003/0052916 | A1* | 3/2003 | Stern | 345/760 |
| 2003/0066065 | A1* | 4/2003 | Larkin | 717/177 |
| 2004/0015954 | A1* | 1/2004 | Tuerke et al. | 717/173 |
| 2006/0015624 | A1* | 1/2006 | Smith et al. | 709/227 |

OTHER PUBLICATIONS

Cratty, John P., "Stop and Go Hardware and Software," *Computer*, IEEE Computer Society, Long Beach, CA, US, v. 26, No. 10, Oct. 1, 1993, p. 78, XP000409192.

'session c' [online]. SourceForge.net, 2002 [retrieved on Nov. 6, 2006]. Retrieved from the Internet: <URL: www.galeoin.cvs.sourceforge.net/galeon/galeon/src/session.c.?.revision-1.104&view=markup>, 14 pages.

'Slouching Toward Galeon 1.0' [online]. Linux Planet, 2001 [retrieved on Nov. 6, 2006]. Retrieved from the Internet: <URL: linuxplanet/com/lunuxplanet/previews/2988/3>, 3 pages.

"Graphical Operations", *IBM Technical Disclosure Bulletin*, vol. 38, No. 5, XP000519693,(May 1, 1995),pp. 591-593.

"International Application Serial No. PCT/IB 03/01237, International Search Report mailed Sep. 9, 2004", 7 pgs.

"Intuitive Desktop Including Navigation Through A Complex Graphical Structure", *IBM Technical Disclosure Bulletin*, vol. 33, No. 11, XP00010321,(Apr. 1, 1991),pp. 78-81.

"Storage Of User Preferences On A Per-User Basis", *IBM Technical Disclosure Bulletin*, vol. 36, No. 1, XP000333775,(Jan. 1, 1993),p. 64.

"Walk-Up-And Personalize Workstation Service", *IBM Technical Disclosure Bulletin*, vol. 37, No. 3, XP000441591,(Mar. 1, 1994),p. 581.

* cited by examiner

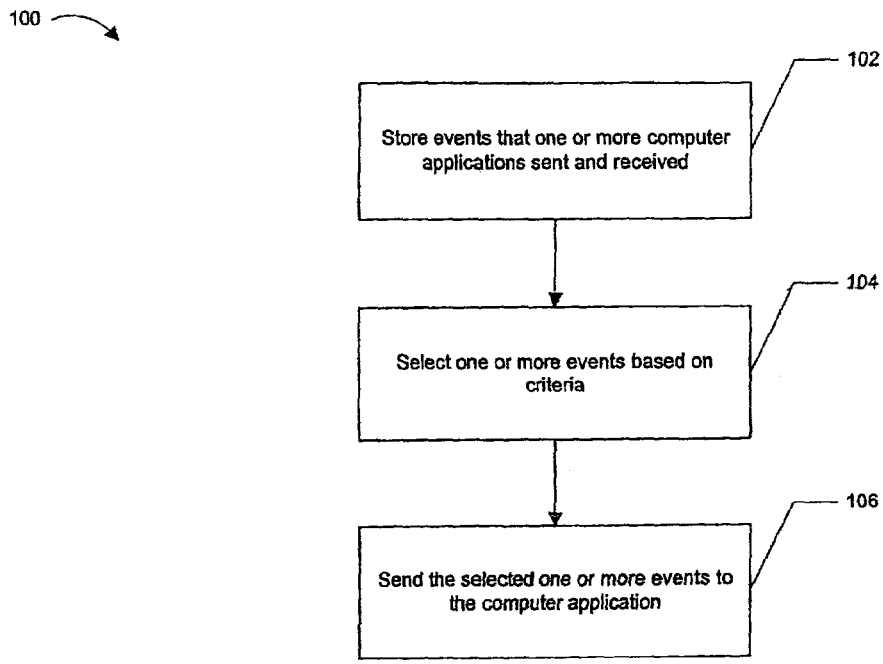
FIG._1
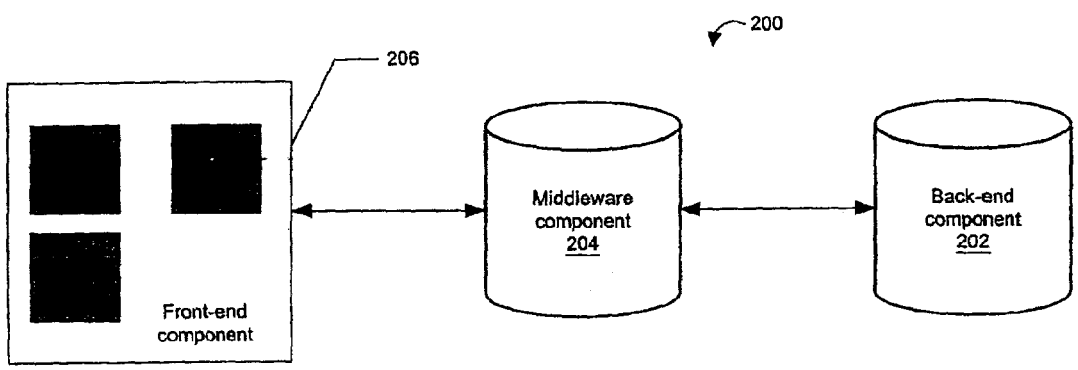
FIG._2

INTELLIGENT AND EVENT-BASED DATA POPULATION

This application claims the priority of U.S. Provisional Application Ser. No. 60/360,669, filed Mar. 1, 2002, which is hereby incorporated by reference in its entirety.

BACKGROUND

The present invention relates to data population of computer applications.

In response to receiving data, usually from a user, a computer application performs its intended function and displays results to the user. After occasions when the computer application does not run, such as a shutdown or a processor timeout, the computer application needs to again receive data in order to perform its intended function and display the results. Otherwise, when it resumes running, the computer application, even though it is running, has no data to process and, hence, cannot display any results.

In preparation for occasions when they do not run, some computer applications persistently store the results. When they resume running, these computer applications retrieve and display the stored results.

SUMMARY OF THE INVENTION

The present invention provides methods and apparatus, including computer program products, for intelligent and event-based data population of computer applications.

In general, in one aspect, a computer program product in accordance with the invention includes instructions for causing a processor to store events sent and received by one or more computer applications. The product includes instructions for selecting one or more events to send to the one or more computer applications in order to populate the one or more computer applications with accurate data. The selection is based on criteria, which include modifiable rules, a user profile, and user preferences. The product includes instructions for sending the selected one or more events to the one or more computer applications.

In general, in another aspect, a method in accordance with the invention for populating one or more computer applications with data includes storing events. Each event specifies an operation that a computer application performed and one or more data objects involved with the operation. The method includes, in response to a start-up of the computer application after an occasion when the computer application does not run, automatically selecting one or more events from the events stored. The method includes sending to the computer application the one or more events selected so that the computer application can produce updated results even when the contents of the data objects have been changed when the computer application was not running.

In general, in another aspect, a computer program product in accordance with the invention for selecting events with which to populate one or more computer applications includes instructions to cause a processor to maintain criteria that specify how to select events. The product includes instructions to access stored events. Each event specifies an operation that a computer application performed and one or more data objects involved with the operation. The product includes instructions to, in response to a start-up of the computer application after an occasion when the computer application does not run, automatically select one or more events from the stored events. The selection is based on the criteria. The product is tangibly stored on machine-readable media.

The invention can be implemented to realize one or any combination of the following advantages. A system in accordance with the invention populates, without requiring a user input, a computer application with data even after an occasion when the computer program does not run. The system stores events that the computer application sent or received and sends an appropriate event to the computer program to populate the computer program with accurate data. Thus, the system advantageously populates the computer application with accurate data even if the computer program has been reconfigured or parameters of the computer application have been changed. Consequently, the system allows the computer application to display accurate results to a user even when the computer application has been reconfigured or the parameters of the computer application have been changed. The system includes intelligence for selecting an appropriate event to send to the computer application so that the needs of the user are satisfied. The system can adapt its intelligence to continuously meet the changing needs of the user. The system includes modifiable criteria that work in conjunction with its intelligence to select an appropriate event. The selection can be based on either a user profile that includes information about the user, the user preferences as specified by the user, or on both. The system can advantageously store its intelligence and criteria at a back-end component, a middleware component, or a front-end component. Similarly, the system can make the selection at either the front-end component or the middleware component. When the system is populating more than one computer application with data, the system can define the order in which the computer applications are populated with data.

The details of one or more embodiments of the invention are set forth in the accompanying drawings and the description below. Other features and advantages of the invention will become apparent from the description and the drawings, and from the claims.

BRIEF DESCRIPTION OF THE DRAWINGS

FIG. 1 shows a method in accordance with the invention for populating a computer application with data.

FIG. 2 shows a system in accordance with the invention for populating a computer application with data.

Like reference numbers and designations in the various drawings indicate like elements.

DETAILED DESCRIPTION

Figure 3:
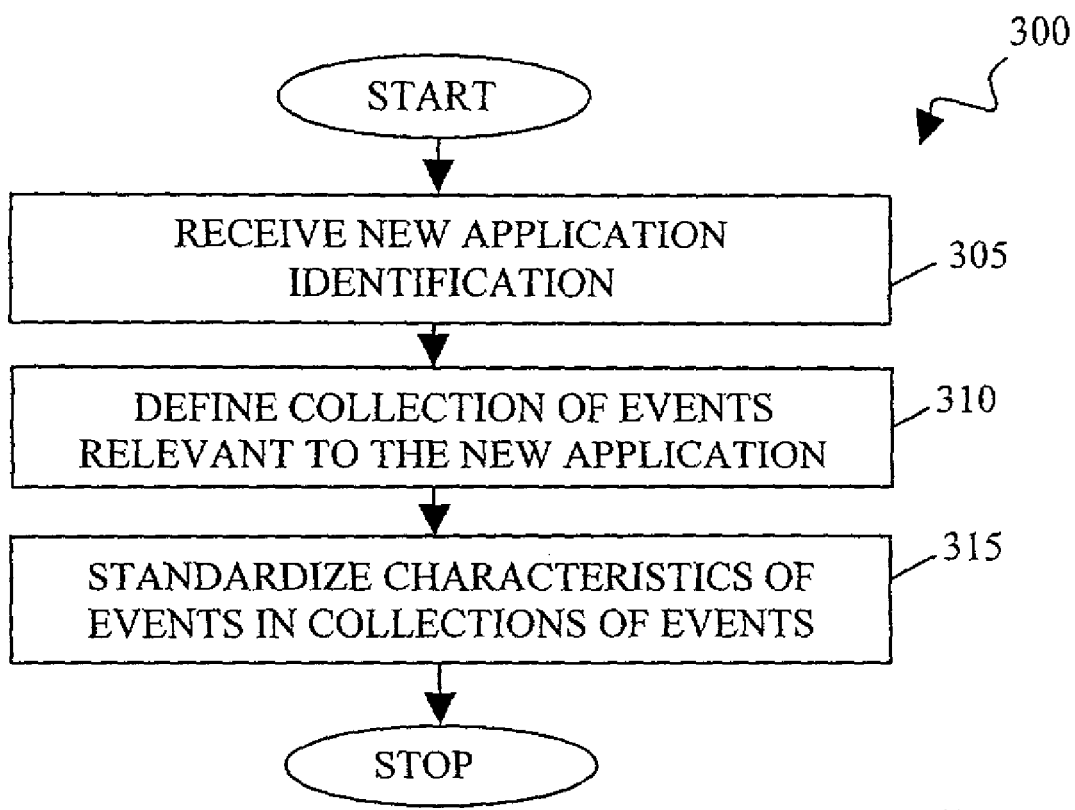
FIG. 3 shows a method in accordance with the invention for preparing a computer application for population with data.

A system in accordance with the invention includes one or more computer applications that communicate with each other and with the other components of the system through events which are sent to and received from the computer applications. An event includes information that specifies one or more data objects and one or more operations associated with the one or more data objects. In response to receiving an event, a computer application performs the specified operation on the specified data object and presents results of the operation to a user. The system accurately populates the computer applications by storing events sent and received by the computer applications and then sending one or more appropriate events to the computer applications.

The following describes an example scenario. A computer application that previously displayed a bill of material ("BOM") for a particular product is shut down and restarted. During the shutdown, the BOM of the product is changed.

After start-up, the system selects an appropriate event, e.g., the event that specifies the data object (i.e., the BOM of the particular product) and the action (i.e., show the BOM) that the computer application last processed before the shutdown, and sends the selected event to the computer application. In response, the computer application selects the BOM, which is updated, and shows the updated BOM. With conventional systems that store only results, the computer application would retrieve the last shown results (which is the BOM that has not been updated) and, hence, would erroneously show an outdated BOM.

FIG. 1 shows a method 100 in accordance with the invention for populating one or more computer applications with data. As shown, the system stores events the one or more computer applications sent and received (step 102). The system persistently stores the events in memory in a middleware component. Alternatively, the system can store the events elsewhere, including a back-end component such as a database or a front-end component such as an Internet browser. Optionally, the system caches the events.

The system selects one or more events to send to the one or more computer applications (step 104). The selection is based on criteria, which include modifiable rules, a user profile, and user preferences. The modifiable rules include default rules and rules that are modifiable by the user, an administrator, or both the user and the administrator. The rules can specify the importance of any of the factors the system considers to determine which event to select. For example, the rules can specify that user preferences are more important than the user profile and, furthermore, that the user profile is more important than any other criteria such as a default selection of a last selected event.

The system performs the selection at a middleware component. Alternatively, the system can perform the selection elsewhere, including a front-end component.

The system sends the selected one or more events to the one or more computer applications (step 106). The one or more computer applications can be located at a remote system. Indeed, the events can be stored at a first system, the events can be selected from a second system, and the events can be sent to one or more computer applications on a third system. Alternatively, the events can be stored on the same system from which they are selected and where the one or more computer applications are located. Other permutations are possible. The one or more computer applications receive the one or more events and perform one or more actions on one or more data objects as specified by the one or more events. The one or more computer applications display the results to the user. Optionally, after the one or more computer applications display the results to the user, the system allows the user to override how the system has populated the computer application. For example, in response to a user request to override, the system shows the stored events to the user, receives a user selection of one or more of the stored events, and sends the events that the user selected to the computer application.

FIG. 2 shows a system 200 in accordance with the invention. The system includes a back-end component 202, such as a data server, in which the system stores data objects and corresponding data structures. The system includes a middleware component 204, such as an application server or an Internet server. The middleware component includes logic and the described criteria for determining how to represent a data structure. The system includes a front-end component 206, such as a WINDOWS® graphical user interface or an Internet browser.

The middleware component 204 exchanges data, including events, with the back-end component 202. The front-end component 206 exchanges data with the middleware component 204. To populate one or more computer applications after an occasion when the one or more computer application do not run, e.g., after a timeout, the middleware component 204 retrieves events from the back-end component 202, determines which event or events to send to the one or more computer applications, and provides the events to the one or more computer applications at the front-end component 206.

The determination is base on criteria. Note that the described criteria are predefined, such as during an initial service customization. Alternatively, the criteria can be defined after the middleware component 204 has retrieved an event from the back-end component 202. The criteria can also be defined by the system 200 by analyzing, e.g., interactions with the user.

The following describe an example scenario where the system determines an event to send to one or more computer applications located at the middleware component 204. Alternatively, the one or more computer applications can be located at the front-end component 206 or the back-end component. The user logs on the system at the front-end component 206 and runs the one or more applications. The user interacts with the one or more applications and causes the applications to send and receive events among each other. The system persistently stores these events.

The system displays results of each of the one or more computer applications the user is running as a window (or an I-view) of in a display area. Alternatively, the system can display the results of the application in any GUI.

Then, there is a timeout because, e.g., the user has not provided any input for a long period of time. After the timeout and when the user restarts the one or more computer applications, the system selects an appropriate event from the events the system has persistently stored. The system selects the last event received by one of the one or more computer applications before the timeout. Alternatively, the system uses one of a user profile, user preferences, and both the user profile and preferences and automatically determines which event with which the user likely wants to work. The system retrieves and broadcasts the selected event to all of the one or more applications. Because each of the one or more computer applications recognizes only certain events, only the applications that recognize the selected events will respond to the broadcasted events. The computer applications that respond subsequently process the event by performing the specified operation on the specified data object and then displaying the results. Where appropriate, the applications that initially responded to the broadcast can send other events to others of the one or more computer applications, which in turn, process these other events and display results. The results the system displays is, thus, updated because the system has repeated the specified operation performed on the specified objects.

In another implementation, the system determines a list of events to send to the first computer application. The user logs on the system at the front-end component. The system determines the list of events. The system selects the last ten events selected. Alternatively, the system uses either one of a user profile, user preferences, and both the user profile and preferences and automatically determines which ten events with which the user likely wants to work. The system retrieves the ten events.

FIG. 3 shows a method 300 in accordance with the invention for preparing a computer application for population with data. As shown, a system receives information identifying a new application (step 305). The new application can execute on the system or at a remote system. The application can be identified, for example, when it first accesses a data object that is specified by the event. Once the system receives the identification information, the system defines a collection of events that are relevant to the application (step 310). To define the collection, the system can add the new event to a table of events already defined as relevant to the application. Additionally, the system can define the collection by adding standard events or a default collection of events supported by a large number of applications to the table of events.

Once the collection of events has been formed, the system can standardize the characteristics of the events in the collections of events for different applications (step 315). The standardized characteristics can be used by various applications to recognize the contents of the events after the applications receive the event. One characteristic that can be standardized is the name of the operation specified by the event. With standardized names for the operation specified by the event, each application is able to identify and perform the one or more actions on the one or more data objects specified by the event.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM disks. Any of the foregoing can be supplemented by, or incorporated in, ASICs ("application-specific integrated circuits").

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular implementations. Other implementations are within the scope of the invention. For example, the steps of the invention can be performed in a different order and still achieve desirable results. The back-end component can be any data storage system such as a database, a file system, or a directory LDAP. The middleware component can be any system that is able to interact with the data stored in the back-end component, including a database management system, an Internet application, and an application server. The front-end can be any user interface, including a browser and a Microsoft WINDOWS graphical user interface. The system can store and determine events at different locations. For example, the system stores events and criteria and determines events at the front-end component. Alternatively, the system stores events and criteria and determines events at the middleware component, which can be, e.g., an Internet server. Alternatively, the system stores events and criteria at the middleware component and determines events at the front-end component. Alternatively, the system stores events and criteria and determines events at the back-end component. Alternatively, the system stores events at the back-end component and determines events at the middleware component. Alternatively, the system stores events at the back-end component and determines events at the front-end component by using the middleware component. The system can store events and criteria at separate locations. The system can define the sequence in which to populate computer applications when there are more than one computer applications. For example, if the results generated when a first application receives an event contribute to the appropriate event to be presented to a second application, the system first populates the first computer application.

What is claimed is:

1. A computer-implemented method of populating one or more computer applications with data comprising events, the method comprising:
   storing event data corresponding to the events received from the one or more computer applications, the event data specifying an operation and identifying at least one of one or more data objects involved with the operation;
   in response to a start up of a computer application after an occasion when the computer application stopped running, automatically selecting event data of one or more events, wherein:
      the event data of at least one event includes data specifying an update operation to a data object persistently stored by the computer application; and
      selecting the event data includes selecting event data corresponding to:
         events that were last sent and received by the computer application before the computer application stopped running; and
         events that occurred while the computer application was not running; and
   in further response to a start up of a computer application, sending the automatically selected event data to the computer application to cause the computer application to automatically perform an operation on the data object persistently stored by the computer application, the operation corresponding to events of the automatically selected event data and display updated results of the data object based on the performed operation.

2. The method of claim 1, further comprising:
   when there are more than one computer applications to populate with data, defining an order with which to populate the computer applications.

3. The method of claim 1, wherein selecting the event data includes:
   selecting the event data based on a user preference as specified by the user.

4. The method of claim 1, wherein selecting the event data includes:
selecting the event data based on a user profile that describes past user behavior.

5. The method of claim 1, wherein selecting the event data includes:
selecting the event data based on modifiable rules.

6. The method of claim 1, wherein storing event data includes:
storing the event data in a front end component of a computing system.

7. The method of claim 1, wherein storing event data includes:
storing the event data in a back-end component of a computing system.

8. The method of claim 1, wherein storing event data includes:
storing event data in a middleware component of a computing system.

9. The method of claim 1, further comprising:
receiving user input specifying event data of one or more events other than the selected event data, the user input overriding the selection; and
sending, to the computer application, the event data specified by the user input.

10. The method of claim 1, wherein:
a start up of the computer application after an occasion when the computer application stopped running includes a start up after a processor timeout.

11. The method of claim 1, wherein sending the event data to the computer application comprises:
sending the event data to a remote system.

12. The method of claim 1, further comprising:
identifying that the event data selected is relevant to the computer application.

13. The method of claim 12, wherein identifying that the event data selected is relevant comprises:
comparing the event data with a collection of relevant event data for the computer application.

14. A computer program product, stored on one or more machine readable media, for selecting events with which to populate one or more computer applications, the computer program product comprising instructions to cause one or more processing devices to:
maintain criteria that specify how to select events;
access stored event data corresponding to events received from the one or more computer applications, the event data specifying an update operation and one or more data objects involved with the update operation; and
in response to a start up of the computer application after an occasion when the computer application stopped running, automatically select one or more events included in the event data, the one or more events including events that were last sent and received by the computer application before the computer application stopped running and events that occurred while the computer application was not running, the selection being based on the criteria and such that the computer application can automatically perform an operation, without further human user input, on a data object stored by the computer application, the operation corresponding to the one or more automatically selected events and display updated results of the data object based on the performed operation.

15. The product of claim 14, further comprising instructions to:
when there are more than one computer applications to populate with data, define an order with which to populate the computer applications.

16. The product of claim 14, wherein the product comprises instructions to:
access an event stored at a remote system.

17. The product of claim 14, wherein the criteria include:
a user preference as specified by a user.

18. The product of claim 14, wherein the criteria include:
a user profile that describes a user's past behavior.

19. The product of claim 14, wherein the criteria include:
modifiable rules; and
default rules.

20. The product of claim 19, wherein the rules specify which of a user preference and a user profile supersedes one other.

21. The product of claim 14, further comprising instructions to:
store the event data in a middleware component of a computing system.

22. The product of claim 14, further comprising instructions to:
store the event data in a back-end component of a computing system.

23. The product of claim 14, further comprising instructions to:
store the event data in a front-end component of a computing system.

24. The product of claim 14, further comprising instructions to:
receive user input specifying one or more events other than the selected on or more events, the user input overriding the selection; and
send the one or more events specified by the user input.

25. The product of claim 14, wherein:
a start up of the computer application after an occasion when the computer application stopped running includes a start up after a processor timeout.

* * * * *